United States Patent [19]

Hartman

[11] Patent Number: 4,688,985
[45] Date of Patent: Aug. 25, 1987

[54] ROTARY MECHANISM FOR ROBOT ARMS

[76] Inventor: John F. Hartman, Box 50 Gardiner Rd., Apalachin, N.Y. 13732

[21] Appl. No.: 737,493

[22] Filed: May 24, 1985

[51] Int. Cl.[4] ................................................ B25J 3/00
[52] U.S. Cl. .................................. 414/744 R; 901/11; 901/21; 74/89.21
[58] Field of Search ................... 414/719, 735, 744 R, 414/744 A, 744 B, 744 C, 917; 901/11, 13, 15, 18, 21, 22, 46; 198/468.6; 74/89.2, 89.21, 89.22, 108

[56] References Cited

U.S. PATENT DOCUMENTS

| | | | |
|---|---|---|---|
| 3,235,101 | 2/1966 | Milhaupt | 198/468.6 X |
| 3,608,743 | 9/1971 | Mosher | 901/21 X |
| 3,695,473 | 10/1972 | Martin | 74/89.21 X |
| 3,798,979 | 3/1974 | Kienhofer | 414/744 C X |
| 3,896,681 | 7/1975 | Boyle | 901/18 X |
| 3,935,950 | 2/1976 | Burch | 901/13 X |
| 3,972,422 | 8/1976 | Mink | 901/13 X |
| 4,266,910 | 5/1981 | Pickard | 414/735 |
| 4,312,622 | 1/1982 | Favareto | 901/22 X |

Primary Examiner—Robert J. Spar
Assistant Examiner—Lyle Kimms
Attorney, Agent, or Firm—Shlesinger, Arkwright, Garvey & Fado

[57] ABSTRACT

A rotary mechanism for robot arms and the like includes a base and a shaft rotatably connected to the base and extending therefrom. A first sprocket is carried by the shaft and a second sprocket is rotatably connected to the base in alignment with the first sprocket. A chain is operatively carried by and extends between the first and second sprockets so that movement of the chain causes cooperative rotation of the sprockets and thereby of the shaft. A cylinder and piston assembly has a first end connected to the base and a second longitudinally movable end engaged with the chain intermediate the first and second sprockets so that longitudinal movement of the second end causes associated movement of the chain and thereby rotation of the shaft. A manipulator is carried by the shaft and is pivotally disposed at one end thereof. A table is carried by the shaft and is disposed intermediate the one end and the first sprocket. Rest assemblies extend a preselected distance from the table and the rest assemblies are engagable with the manipulator and position the manipulator at preselected angular orientations relative to the axis of the shaft. A cylinder and piston assembly is used for pivoting the manipulator into engagement with the rest assemblies.

33 Claims, 5 Drawing Figures

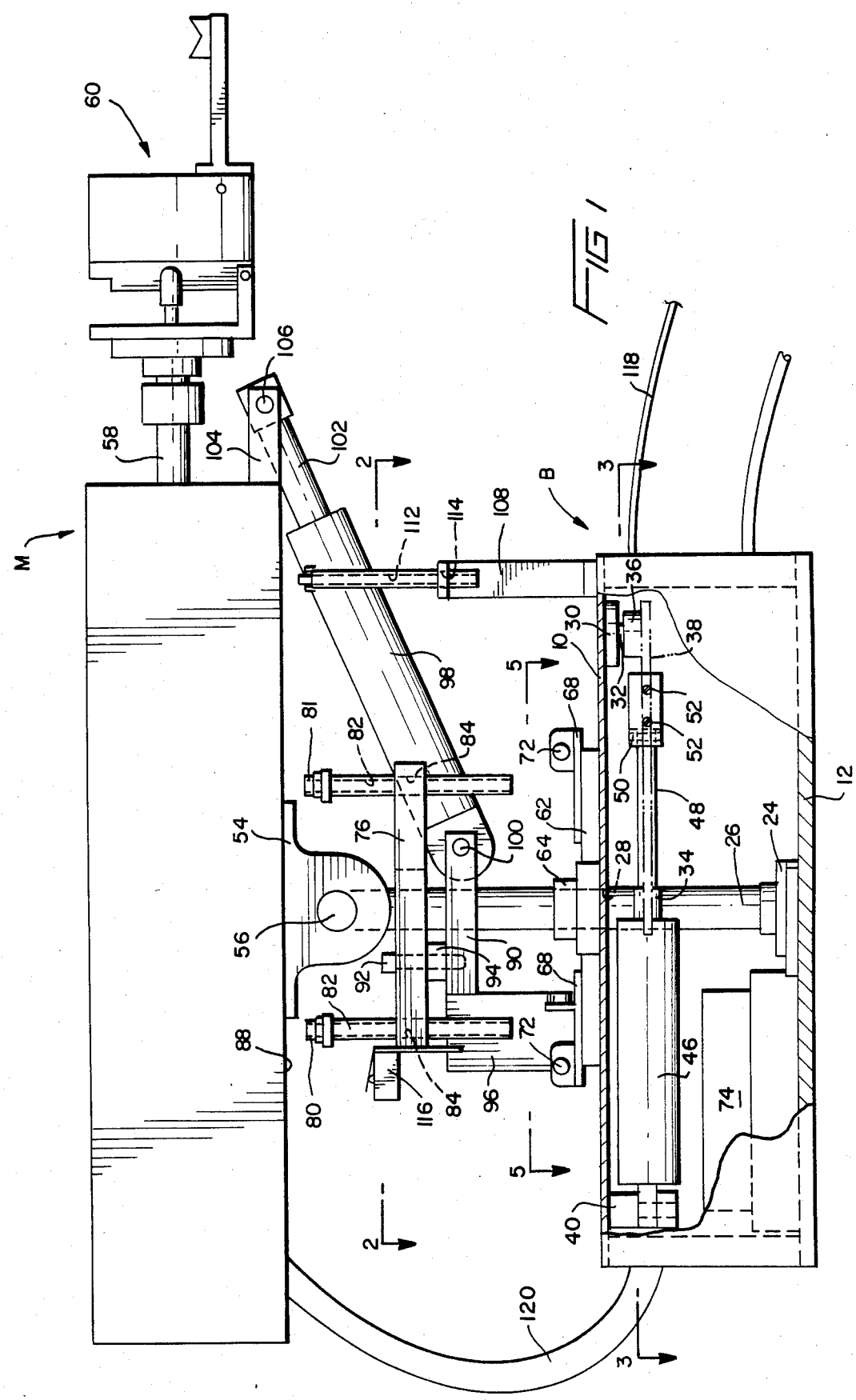

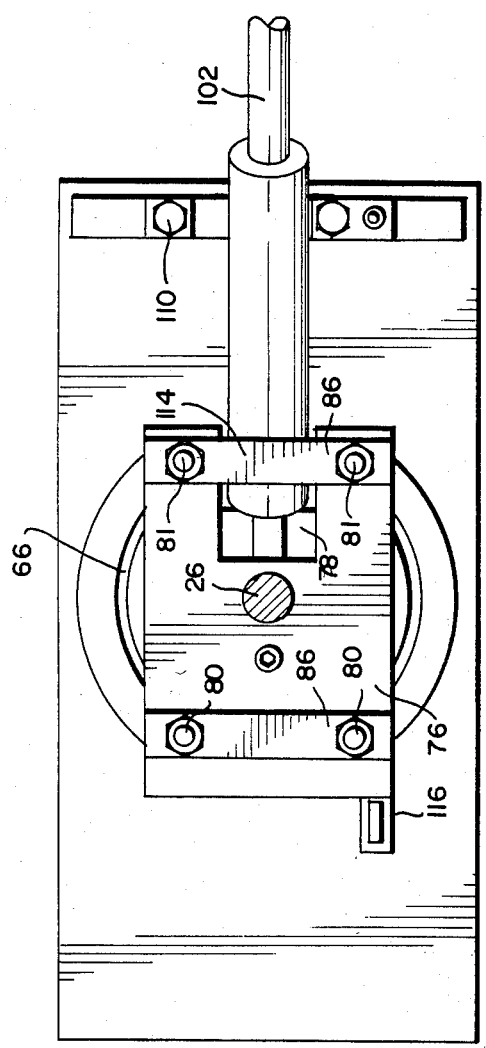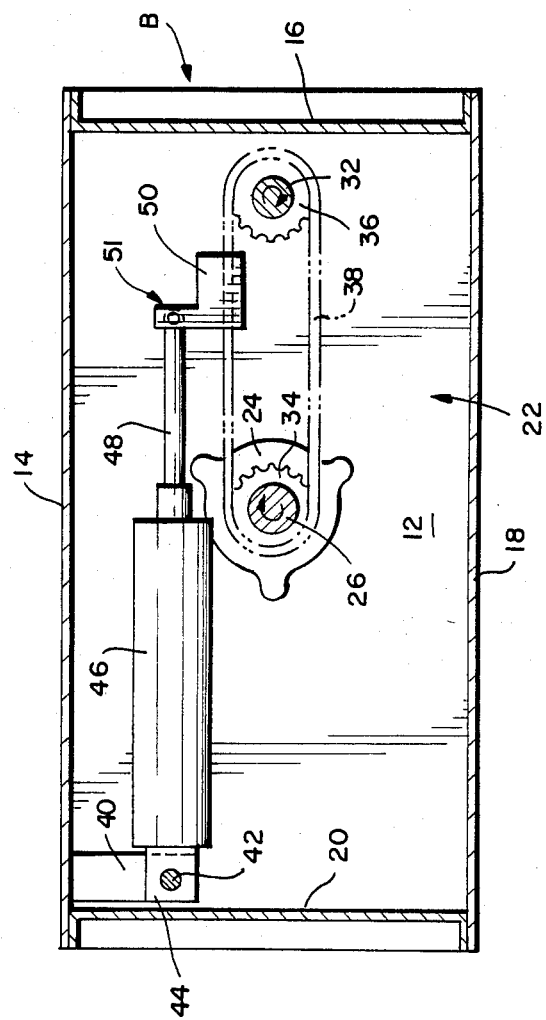

ROTARY MECHANISM FOR ROBOT ARMS

BACKGROUND OF THE INVENTION

Many industrial processes and operations require the use of automated equipment to maintain manufacturing efficiencies. Robots have long been used as an integral part of factory automation and the use thereof has increased substantially in the recent past. The growing sophistication of computer electronics has permitted robots to be utilized in increasing ways to perform tasks requiring a high level of sophistication and accuracy. The costs of the electronic systems has decreased dramatically and has therefore permitted robot use to increase. Unfortunately, the mechanical components of the robot have not decreased in cost and simplicity as much as the electronic components.

Prior art robots have been either very complicated sophisticated assemblies capable of extreme accuracies or relatively simple unsophisticated assemblies of much lower accuracy levels. Modern machine tools are capable of producing parts within extremely minute tolerances and, consequently, utilization of a robot in a machine tool system requires that the robot be extremely accurate. A robot utilized in a machine tool system must also be capable of accurately reproducing a particular set of movements if the machine tool is to be properly operated. Consequently, the robot, when utilized in a machine tool system, must include positive means for assuring proper placement and orientation of raw materials and finished products.

A further requirement is that the robot utilize simple mechanical systems which are not subject to a high probability of failure. Machine tool components are extremely reliable and the robot must therefore also be extremely reliable so as not to stop operation of the machine tool. As a consequence, the robot must be capable of being easily repaired and not require sophisticated maintenance procedures.

Finally, many machine tool users have limited free space. Successful utilization of a robot, therefore, requires that the robot not occupy an inordinate amount of space. Such a robot must, therefore, be compact in order to permit ready application to existing machine tool operations.

From the above, it can be seen that a robot suitable for use in a machine tool environment must be relatively inexpensive to manufacture, have a high degree of accuracy and require little floorspace. The ability to accurately and repeatedly position raw materials, such as round stock and the like, is of paramount importance. Additionally, the ability to accurately and repeatedly remove finished products from the machine tool and transport the finished product to a downstream processing operation is also necessary. The robot must be able to be programmed so as to perform various steps required in the machining of many parts. The disclosed invention provides such a robot and one which overcomes the limitations of the prior art.

Richter, U.S. Pat. No. 3,826,383, discloses an automatic handling apparatus wherein a robot manipulator is mounted to a rotatable base. The base is rotated through utilization of a V-belt which is driven by an electric motor. Such a system is relatively complicated and the accuracy and the speed of rotation are limited by the mass of the base and the attached manipulator. Additionally, V-belts are subject to stretching and therefore slippage on the sheeve. Consequently, the rotation system of Richter is not totally satisfactory for machine tool applications.

Ott, U.S. Pat. No. 3,522,838, discloses a diecasting extractor wherein the manipulator is rotated by means of a rack and pinion assembly. The rack is an integral part of the piston and the teeth of the rack are directly engaged with the teeth of the pinion. Consequently, displacement of the piston causes associated rotation of the manipulator. The rotation mechanism of Ott is not totally satisfactory because the rack operates directly on the pinion. Consequently, the inertia of the manipulator must be overcome by the cylinder and piston assembly if rotation is to be accomplished. Furthermore, rotation is a function both of the displacement of the piston and of the gear ratio between the rack and the pinion. Ott fails to disclose any mechanisms for positively assuring that the manipulator has rotated to the proper position. Consequently, accurate repeatability of rotation is not satisfactory.

Boyle, U.S. Pat. No. 3,954,188, discloses a universal transfer device wherein a robot manipulator is rotated by means of a chain drive system. Boyle further discloses the use of intermediate stops to provide stop positions as required. The stops are mounted on a stop plate and utilize threaded holes. It can be appreciated that the Boyle device is rather complicated. The chain is rotated by means of an hydraulic motor and the rotation thereof is susceptible to inaccuracies due to pressure fluctuations and the inertia of the manipulator. The utilization of an hydraulic system is also not totally satisfactory because of the operating pressures which are required. A similar system is disclosed in Shum, U.S. Pat. No. 4,392,776. Shum uses a chain drive mechanism and a rotary hydraulic motor to rotate the robot. As previously indicated, pressurized hydraulic systems are not totally satisfactory for various reasons.

In view of the above, it can be seen that none of these systems provides a totally satisfactory solution for a robot rotary drive mechanism which may be utilized in a machine tool environment. The above patents are all complicated systems which are susceptible to inaccurate positioning. These systems require sophisticated maintenance and are likely to break down more often than the machine tool which they service.

OBJECTS AND SUMMARY OF THE INVENTION

The primary object of the disclosed invention is to provide a robot capable of utilization in a machine tool environment and one which overcomes the deficiencies of the prior art robots, as above discussed.

An additional object of the disclosed invention is to provide a rotary mechanism for a robot which utilizes pressurized air as the power source for operating the robot.

Yet another object of the disclosed invention is to provide a plurality of rests which positively angularly orient the manipulator relative to the axis of the rotating shaft.

Still yet another object of the disclosed invention is to provide a plurality of angularly positionable stops which cooperate with the manipulator and with the control mechanism for assuring proper rotation of the shaft.

Still another object of the disclosed invention is to provide an air powered cylinder and piston assembly which is connected to a chain drive mechanism for rotating the shaft.

Still another object of the disclosed invention is to provide that the cylinder and piston assembly is mounted in a housing and is disposed above the control system of the robot so that the robot and the housing form a compact unit.

In summary, the disclosed invention is a compact economical robot rotary mechanism which is readily adapted for use in a machine tool environment. Two air powered cylinder and piston assemblies are provided for rotating the shaft and for pivoting the manipulator arm. Air powered systems are utilized because the application force is not excessive and may therefore be utilized in cooperation with rests. The rests, as well as the stops, provide positive alignment of the manipulator assembly at the proper angular orientation and position.

These and other objects and advantages of the invention will be readily apparent in view of the following description and drawings of the above described invention.

DESCRIPTION OF THE DRAWINGS

The above and other objects and advantages and novel features of the present invention will become apparent from the following detailed description of the preferred embodiment of the invention illustrated in the acompanying drawings, wherein:

FIG. 1 is a side elevational view of the robot of the invention with portions of the housing broken away;

FIG. 2 is a cross-secional view taken along the section 2—2 of FIG. 1 and viewed in the direction of the arrows;

FIG. 3 is a cross-sectional view taken across the section 3—3 of FIG. 1 and viewed in the direction of the arrows;

DESCRIPTION OF THE INVENTION

Figure 4:
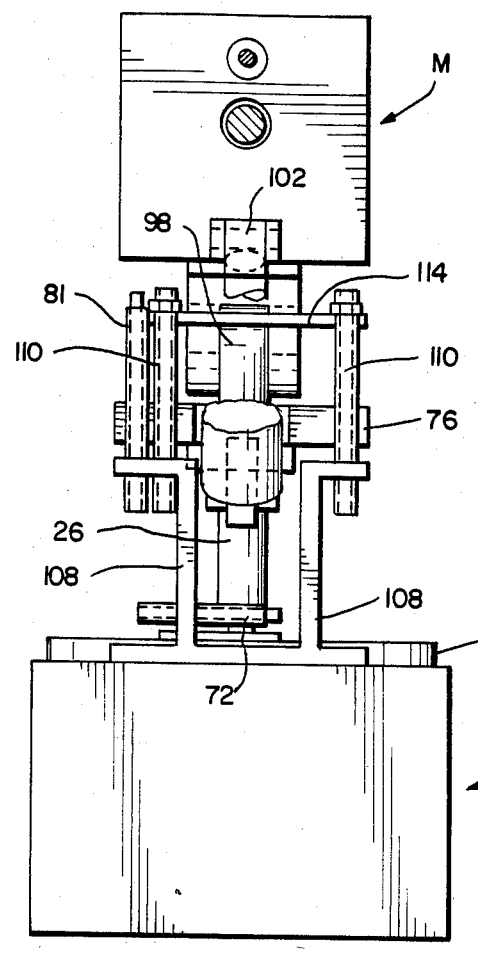
FIG. 4 is a front elevational view with portions broken away; and, FIG. 5 is a fragmentary cross-sectional view take along the section 5—5 of FIG. 1 and viewed in the direction of the arrows.

As best shown in FIGS. 1 and 3, base B is a housing defined by top wall 10, bottom wall 12 and side walls 14, 16, 18 and 20, all of which are, preferably, integral and formed from a single sheet. It can be noted from FIG. 3 that side walls 14 and 18 are parallel and are disposed perpendicular to side walls 20 and 16 which are parallel to each other. While the base B is disclosed as being rectangular, those skilled in the art will appreciate that other configurations are suitable, depending upon the application. The base B, therefore, provides a chamber 22 in which additional components, as will be further explained, are positioned. It can be noted from FIG. 1, however, that the height of the side walls 14, 16, 18 and 20 is much less than is the length of the top and bottom walls 10 and 12, respectively.

As best shown in FIGS. 1 and 3, a bearing assembly 24 is secured to bottom wall 12 centrally and substantially equidistant side walls 16 and 20 and 14 and 18. Shaft 26 is journaled in bearing assembly 24 and is adapted for rotation therewith. It can be noted in FIG. 1 that an aperture 28 is disposed in top wall 10 and shaft 26 extends upwardly therefrom a substantial distance. A bearing assembly 30 is secured to the bottom surface of top wall 10 and a shoulder screw 32 is journaled in bearing assembly 30 and is disposed parallel to the axis of rotation of shaft 26.

Sprocket 34, as best shown in FIG. 3, is affixed to shaft 26 and rotates therewith. Sprocket 36 is rotatably carried by shoulder screw 32. Chain 38 is operatively engaged with the sprockets 34 and 36 and extends therebetween so that movement of one of the sprockets 34 or 36 causes associated movement of the other one of the sprockets 34 and 36. Similarly, movement of the chain causes cooperative associated rotation of the sprockets 34 and 36 and thereby of shaft 26. It can be noted that the chain-carrying portions of the sprockets 34 and 36 rotate on a common plane and that the chain 38 is disposed on the plane. Likewise, it can be noted in FIG. 3 that the sprockets 34 and 36 are of substantially equal diameter, but those skilled in the art can appreciate that the sprockets 34 and 36 can be sized to provide a transmission affecting the speed at which the shaft 26 rotates.

Clevis 40 is secured to the underside of top wall 10 and is spaced proximate side wall 20. Pin 42 of clevis 40 is engaged with member 44 of cylinder 46. Longitudinally extending piston 48 of cylinder 46 is movable parallel to and spaced from the plane intersecting and running along shafts 26 and 32. L-shaped sleeve or jacket 50 is pivotally secured to the distal end 51 of piston 48 and is engaged with chain 38. Preferably, bolts 52, as best shown in FIG. 1, extend through sleeve 50 and engage chain 38 and thereby positively position chain 38 in sleeve 50. Sleeve 50 collapses on chain 38 to prevent relative motion therebetween. Those skilled in the art will appreciate, therefore, that longitudinal displacement of the piston 48 will cause corresponding movement of the chain 38 and thereby rotation of the sprockets 34 and 36 and of the shaft 26. Consequently, inward and outward movement of the piston 48 causes rotation of the shaft 26 on its longitudinal axis. While the cylinder 46 and piston 48 are disclosed as being parallel to the plane extending along and intersecting the shafts 32 and 26, those skilled in the art can appreciate that the pivotal connection provided by the pin 42 with the member 44 in combination with the pivot at the distal end 51 of piston 48, will permit angular orientation of the cylinder 46 and the piston 48.

Manipulator arm M has a Journal 54 extending from the lower surface thereof journaled to the distal end of shaft 26 by pin or shaft 56. The pin 56 is disposed transverse to the axis of shaft 26 so that the manipulator arm M is thereby capable of being angularly pivoted for angular orientation relative to the axis of shaft 26. The manipulator arm M is a conventional robot arm and includes a longitudinally displaceable shaft 58 to which manipulator jaw assembly 60 is operatively connected. The jaw assembly 60 may be used to pick-up raw material or to receive finished products.

Figure 5:
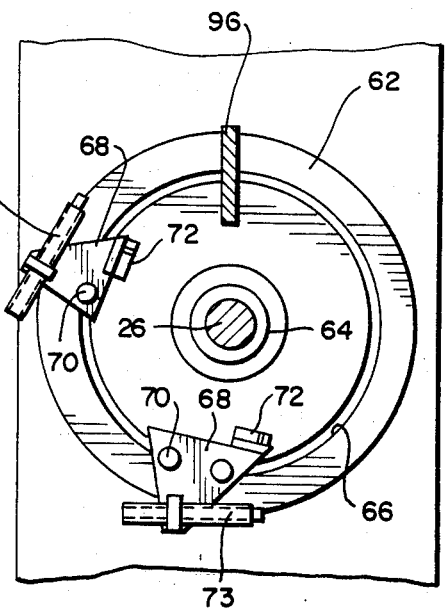

As best shown in FIGS. 1 and 5, platform assembly 62 is mounted to the top surface of top wall 10. Platform assembly 62 includes a bearing assembly 64 disposed about aperture 28 and journaled to shaft 26. It can be appreciated, therefore, that the bearing assemblies 64 and 24 permit free rotation of the shaft 26 about its longitudinal axis. Annular groove 66 of FIG. 2, is disposed about platform assembly 62 coaxial with shaft 26. The groove 66 is spaced near the periphery of platform assembly 62. Stop members 68 have a portion thereof positionable in groove 66 (FIG. 5). Preferably, two stop members 68 are provided and each of the stop members 68 has at least one cap screw 70 engageable with the walls of the groove 66 in order to lock the stop members 68 in position. Loosening of the cap screws 70 permits the stop members 68 to be circumferentially moved relative to the groove 66, for reasons to be explained herein later. Preferably, each of the stop members 68 has a switch 72 carried thereby tangential to the periphery of the platform assembly 62. It is preferred, for reasons to be explained hereinlater, that the switches 72 be of the proximity type. Each of the switches 72 is in electrical connection by conventional wiring or the like with the electrical controls 74 disposed in chamber 22 below cylinder 46.

Damping shocks 73 extend from each of stop members 68 in order to absorb the shock or force caused by engagement with the stop system for the shaft 26, as will be further explained.

As best shown in FIGS. 1 and 2, table 76 is secured to and carried by shaft 26. The table 76 is preferably rectangular in shape and is aligned so that the length thereof extends longitudinally of the manipulator M. The table 76 contains a cut-out portion 78 facing the jaw assembly 60, for reasons to be explained hereinlater. Rests 80 and 81 extend upwardly generally from respective corners of the table 76. The rests 80 and 81 preferably have a threaded portion 82 of substantial length which is threadedly engaged in threaded apertures 84 in table 76. Because of the threaded engagement between the portion 82 in the apertures 84, the height of the rests 80 and 81 above the table 76 may be adjusted. Preferably, bands 86 extend widthwise of table 76 and connect adjacent pairs of rests 80 and 81. It can be noted in FIG. 1, that the damping shock 81, proximate jaw assembly 60, absorbs the shock or force caused by engagement of arm M with stops or rests 80 and 81, as will be further explained. It should also be obvious, because the table 76 is carried by the shaft 26, that the rests 80 and 81 always maintain their preset alignment with the jaws 60. The rests extend parallel to the shaft 26 and the rests 80 and 81 are engageable with the undersurface 88 of manipulator arm M. It can be noted in FIG. 2 that the rests 80 and 81 are disposed on either side of housing 54 so that the housing 54 does not engage the rests 80 and 81 but, rather, the rests 80 and 81 engage the undersurface 88 (FIG. 1).

As best shown in FIG. 1, secondary table 90 is secured to shaft 26 just below table 76. Bolt 92 extends through table 76 and spacer block 94 to secondary table 90. The secondary table 90 is, preferably, a rectangular table and is in alignment with table 76. The bolt 92, thereby, maintains proper alignment and spacing of the table 76 relative to the secondary table 90. Leg 96 extends downwardly from secondary table 90 a distance sufficient to permit the leg 96 to contact the cap screws 70 and to operate the proximity switches 72 (FIGS. 1 and 5), for the electrical controls 74 to indicate that the shaft 26 has rotated a predetermined amount.

Cylinder 98 is journaled to the forward portion of secondary table 90 by means of pin 100. Piston 102 of cylinder 98 is journaled to extension 104 of manipulator arm M by means of pin 106. It can be noted in FIG. 2 that cylinder 98 extends through cut-out portion 78.

As best shown in FIGS. 1 and 4, L-shaped members 108 extend upwardly from top wall 10 proximate front wall 16. Rests 110 have a threaded portion 112 of substantial length received in apertures 114 of members 108. The rests 110 are similar to the rests 80 and 81 and a brace 114 connects the rests 110. It can be noted in FIGS. 2 and 4 that the rests 110 are not in longitudinal alignment with the rests 80 and 81 for purposes subsequently described. The members 108 may be adjacently disposed about the top surface of top wall 10 depending upon the angular orientation that the manipulator arm M is to have about the shaft 26 for a particular purpose, as will be further explained.

As best shown in FIGS. 1 and 2, switch 116 is carried by table 76. The switch 116 is in electrical connection with the controls 74.

The cylinders 46 and 98 are, preferably, air-powered. Air line 118 is shown in FIG. 1 and supplies air for cylinders 46 and 98. Similarly, shaft 58 is longitudinally displaceable by means of an air-operated cylinder (not shown) through air line 120. Air operated cylinders 46 and 98 are preferred because pressurized air is readily available in most industrial settings and does not require the high pressures which are required by fluid hydraulics. Similarly, air cylinders, such as cylinders 46 and 98, are relatively quick acting but exert relatively low forces when compared to conventional hydraulic cylinders. Low forces are preferred because of the rests 80, 81 and 110. The rests 110 are used to position the manipulator arm M at a predetermined angular orientation relative to the axis of the shaft 26 and thereby provide a positive positioning mechanism because of the engagement of the undersurface 88 therewith. Consequently, the piston 102 need not be pressure controlled, as in conventional hydraulic cylinders, because the cylinder 98 puts out insufficient force to cause damage to the manipulator arm M by the rests 80 and 81 and 110. In other words, the piston 102 can be extended at maximum speed until such time as the undersurface 88 contacts and engages the rests 80 or 81 or 110. The application of additional pressurized air to the cylinder 98 will not be sufficient to cause damage to the manipulator arm M or to the cylinder 98, as may happen with conventional hydraulic cylinders.

For a similar reason, air-operated cylinder 46 is preferred because of the speed with which the piston 48 is displaced and the relatively low force which is generated. Rotation of the shaft 26 caused by longitudinal displacement of the piston 48 results in the leg 96 approaching one of the switches 72. As previously stated, the switches 72 are proximity switches so that the approach of the leg 96 is thereby sensed and transmitted to the electrical controller 74. Cap screw 70 provides the stop on which leg 96 rests in order to verify that this position has been achieved. The electrical controller 74 can thereby regulate the air flow to the cylinder 46 by a conventional valve mechanism (not shown), and thereby prevent the shaft 26 from rotating by too great an amount. This avoids the possibility of damage to the switches 72 because the leg 96 thereby approaches the switches 72 at a relatively low speed and is stopped by cap screw 70. Conventional hydraulic cylinders 46 operate at such high pressures that precise regulation of the rotation and positioning of the shaft 26 about the axis cannot be accurately controlled without substantial complication.

OPERATION

The operation of the rotary system of the invention is relatively simple because of the rests 80, 81 and 110 and the switches 72 and cap screws 70. The rests 80 and 81 are maintained in alignment with the jaw assembly 60, as best shown in FIG. 1, because the table 76 is carried by the shaft 26. The forward rests 81, as viewed to the right in FIG. 1, thereby control the downward pivoting of the manipulator arm M while the rearward rests 80, as viewed to the left in FIG. 1, control the upward pivoting. The rests 110 control the downward pivoting when the manipulator arm M is rotated 180° from the position shown in FIG. 1. Arm M is tilted and brought to this position where cap screw 70 stops arm M so that it can then be lowered onto rest 110. In any other position, it must be lowered onto stops 80 and shocks 81. Consequently, adjustment of the forward rests 81 and/or 110 controls the downward pivoting of the manipulator arm M by the cylinder 98.

Each of the stop members 68 is moved relative to the groove 66 to a predetermined position associated with an operation by the jaw assembly 60. The cap screws 70 are then tightened to lock the stop members 68 in position. The head provides the positive stop of the angular relation of the shaft 26 by use of leg 96. Consequently, angular rotation of the shaft 26 on its axis will thereby be controlled because of the proximity switches 72. Once the angular orientation about the shaft 26 is determined, then adjustment of the rests 80, 81 and 110 may be accomplished. The rests 80, 81 and 110 are preset so that the manipulator arm M achieves a predetermined angular orientation relative to the axis of the shaft 26 when the shaft 26 has rotated by predetermined amounts as defined by the switches 72 and cap screws 70. Consequently, the switches 72, the cap screws 70 and the rests 80, 81 and 110 in combination with the electric controls 74 provide a rotary mechanism which is of simple manufacture and yet capable of sustained repeatable accurate operaton.

Rotation of shaft 26 causes leg 96 to engage the damping shocks 73 extending from the stop members 68. The rotation of shaft 26 is therefore slowed down prior to engagement of leg 96 with cap screw 70. The air pressure applied to cylinder 46, causing movement of piston 48, causes the leg 96 to be held against the cap screw 70 so that positive stopping of rotation is provided. Furthermore, the use of air cylinder 46 prevents the shaft 26 from counter-rotating or damaging the components of the robot.

Similarly, the undersurface 88 of arm M engages damping shock 81 prior to engagement with rest 110 so that pivoting motion is slowed prior to positive stopping of the pivoting motion.

While this invention has been described as having a preferred design, it is understood that it is capable of further modifications, uses and/or adaptations of the invention following in general the principle of the invention and including such departures from the present disclosure as come within known or customary practice in the art to which the invention pertains, and as may be applied to the central features hereinbefore set forth, and fall within the scope of the invention of the limits of the appended claims.

What I claim:

1. A rotary mechanism for a robot arm and the like, comprising:
   (a) a base;
   (b) first shaft means rotatably connected to said base and extending therefrom;
   (c) first sprocket means secured to said shaft means and rotatable therewith;
   (d) second sprocket means rotatably connected to said base in alignment with said first sprocket means;
   (e) chain means carried by and extending between said first and second sprocket means so that movement of said chain means causes cooperative rotation of said first and second sprocket means and thereby of said first shaft means;
   (f) cylindrical and piston means having a first end portion connected to said base and a second longitudinally movable end portion engaged with said chain means intermediate said first and second sprocket means and said second end portion movable generally transverse to said first shaft means so that longitudinal movement of said second end portion causes associated movement of said chain means and thereby rotation of said first shaft means;
   (g) manipulator means carried by said first shaft means and being pivotally disposed at generally one end thereof;
   (h) table means secured to said first shaft means intermediate said one end and said first sprocket means and rotatable therewith;
   (i) rest means extend from said table means and said rest means engageable with said manipulator means for positioning said manipulator means at a preselected angular orientation relative to the axis of said shaft means;
   (j) means for pivoting said manipulator means and thereby causing said manipulator means to engage said rest means;
   (k) platform means mounted to said base and disposed about said shaft means;
   (l) control means operatively associated with said pivoting means and with said cylinder and piston means for controlling pivoting of said manipulator means and rotation of said shaft means;
   (m) stop means extend from said platform means and are operatively engageable with said shaft means for preventing rotation of said shaft means upon being engaged; and,
   (n) said rest means cooperating with said stop means so that rotation of said shaft means and thereby of said manipulator means to a predetermined position associated with said stop means and pivoting of said manipulator means into engagement with said rest means causes said manipulator means to achieve a predetermined pivoted and directed orientation.

2. The mechanism as defined in claim 1, wherein:
   (a) said first and second sprocket means being coplanar.

3. The mechanism as defined in claim 1, wherein:
   (a) a second shaft means rotatably connected to said base and spaced from said first shaft means;
   (b) said second sprocket means rotatably carried by said second shaft means; and,
   (c) said cylinder and piston means disposed parallel to a plane intersecting and axially extending along said first and second shaft means.

4. The mechanism as defined in claim 3, wherein:
   (a) said cylinder and piston means spaced from the plane intersecting and axially extending between said first and second shaft means.

5. The mechanism as defined in claim 3, wherein:
   (a) said first and second shaft means being axially parallel.

6. The mechanism as defined in claim 1, wherein:
   (a) the cylinder of said cylinder and piston assembly being secured to said base; and,
   (b) the piston of said cylinder and piston assembly engaged with said chain means.

7. The mechanism as defined in claim 1, wherein:

(a) jacket means extend from said second end portion and are fastened to said chain means for thereby securing said chain means to said cylinder and piston means.

8. The mechanism as defined in claim 2, wherein:
(a) said second end portion movable in a plane coincident with said first and second sprocket means.

9. The mechanism as defined in claim 1, wherein:
(a) said table means being longitudinally aligned in parallel relation with said manipulator means.

10. The mechanism as defined in claim 9, wherein:
(a) said table means including front and rear portions; and,
(b) said rest means extending from at least one of said front and rear portions.

11. The mechanism as defined in claim 10, wherein:
(a) said rest means being adjustable and extend from each of said front and rear portions; and,
(b) said rest means of said front and rear portions each extend a preselected distance from said table means for thereby providing two preselected angular orientations for said manipulator means relative to the axis of said shaft means.

12. The mechanism as defined in claim 1, wherein:
(a) secondary table means are carried by said shaft means and are disposed intermediate said table means and said first sprocket means; and,
(b) said pivoting means being connected to said secondary table means and to said manipulator means.

13. The mechanism as defined in claim 13, wherein:
(a) secondary table means being carried by said shaft means and disposed intermediate said table means and said first sprocket means; and,
(b) a portion of said secondary table means being engagable with said stop means.

14. The mechanism as defined in claim 1, wherein:
(a) said stop means being angularly movable about said platform means; and,
(b) lock means being associated with said stop means for maintaining said stop means at a preselected position.

15. The mechanism as defined in claim 14, wherein:
(a) an annular groove being disposed in said platform means coaxial with said first shaft means;
(b) said stop means having a portion thereof positioned in said groove and adapted for permitting movement of said stop means around said groove.

16. The mechanism as defined in claim 1, wherein:
(a) secondary rest means extend from said base and are engageable with said manipulator means for positioning said manipulator means at a predetermined substantially horizontal angular orientation.

17. The mechanism as defined in claim 1, wherein:
(a) said base including a housing having top, bottom and side walls;
(b) a bearing assembly secured to said bottom wall and rotatably supporting said first shaft means;
(c) an aperture in said top wall and said first shaft means extending upwardly through said aperture so that said manipulator means and said table means are disposed above said top wall;
(d) said second sprocket means rotatably mounted to said top wall and spaced downwardly therefrom so that said cylinder and piston means and said first sprocket means are positioned below said top wall; and,
(e) said control means disposed in said housing below said cylinder and piston means.

18. The mechanism as defined in claim 17, wherein:
(a) said cylinder and piston means disposed paralled to said top and bottom walls and to a parallel two of said side walls.

19. The mechanism as defined in claim 17, wherein:
(a) second shaft means extend downwardly from said top wall;
(b) said second sprocket means rotatably carried by said second shaft means; and,
(c) said first end portion pivotally secured to said top wall.

20. The mechanism as defined in claim 17, wherein:
(a) secondary rest means extend upwardly from said top wall and are engageable with said manipulator means for thereby positioning said manipulator means in a predetermined substantially horizontal angular orientation.

21. The mechanism as defined in claim 17, wherein:
(a) said platform means being mounted to the upper surface of said top wall;
(b) secondary table means carried by said first shaft means disposed intermediate said table means and said platform means; and,
(c) a portion of said secondary table means engageable with said stop means for thereby controlling rotation of said shaft means.

22. The mechanism as defined in claim 14, wherein:
(a) said stop means including shock absorber means for cushioning impact thereof by said shaft means.

23. The mechanism as defined in claim 15, wherein:
(a) said stop means disposed radially outwardly from said lock means.

24. A rotary mechanism for a robot arm or the like, comprising:
(a) a base;
(b) first shaft means rotatably mounted to said base and extending therefrom and including pivotal operating means carried thereby and spaced from said base;
(c) first sprocket means secured to said shaft means and rotatable therewith and disposed between said base and said operating means;
(d) second sprocket means rotatably secured to said base at a distance from said first shaft means in alignment with said first sprocket means so that said first and second sprocket means rotate on a common plane;
(e) chain means carried by and extending between said first and second sprocket means so that rotation of said second sprocket means causes cooperative rotation of said first sprocket means and thereby of said shaft means and said operating means;
(f) cylinder and piston means mounted to said base and disposed transverse to said shaft means and on said common plane;
(g) a first end portion of said cylinder and piston means secured to said base and a second end portion longitudinally movable on said plane in response to operation of said cylinder and piston means and said second end portion secured to said chain means intermediate said first and second sprocket means so that longitudinal movement of said second end portion causes associated movement of said chain means and thereby rotation of said first and second sprocket means and of said first shaft means;
(h) said base includes top, bottom and side walls;

(i) an aperture disposed in said top wall;
(j) said first shaft means has a first end portion mounted to said bottom wall and aligned with said aperture;
(k) a second end portion of said first shaft means extends upwardly beyond said top wall;
(l) table means mounted to said first shaft means second end portion and rotatable therewith;
(m) stop means mounted to said top wall and engageable with said table means for stopping rotation of said first shaft means;
(n) said operating means including manipulator means pivotally mounted to said first shaft means second end portion;
(o) pivot means connected to said manipulator means for causing pivoting thereof;
(p) secondary table means carried by said first shaft means and disposed axially downwardly from said table means;
(q) at least a first rest means extending upwardly from said table means; and,
(r) control means operatively associated with said cylinder and piston means and with said pivot means for causing said manipulator means to engage said rest means when said shaft means and said manipulator means have rotated to a preselected position set by said stop means whereby said rest means provides positive positioning of said manipulator means.

25. A mechanism as defined in claim 24, wherein:
(a) a bearing assembly being secured to said base;
(b) second shaft means rotatably secured to said bearing assembly; and,
(c) said second sprocket means carried by said second shaft means.

26. The mechanism as defined in claim 24, wherein:
(a) said cylinder and piston means first end portion is pivotally secured to said base.

27. The mechanism as defined in claim 25, wherein:
(a) said cylinder and piston means being laterally spaced from each of said shaft means.

28. The mechanism as defined in claim 27, wherein:
(a) coupling means are secured to said cylinder and piston means second end portion and to said chain means for maintaining said cylinder and piston means spaced from each of said shaft means.

29. The mechanism as defined in claim 24, wherein:
(a) platform means being mounted to the top surface of said top wall;
(b) an aperture in said platform means;
(c) said shaft means extending through said aperture in said platform means; and,
(d) said stop means positioned about said platform means.

30. The mechanism as defined in claim 29, wherein:
(a) an annular groove being disposed about said platform means;
(b) mounting means slideably positioned in said groove and carrying said stop means for permitting angular positioning of said stop means about said platform means; and,
(c) lock means associated with said mounting means for maintaining said mounting means in a preselected position.

31. The mechanism as defined in claim 24, wherein:
(a) said stop means includes a limit switch.

32. The mechanism as defined in claim 24, wherein:
(a) said stop means including shock absorber means engageable with said table means for cushioning inpact therewith.

33. The mechanism as defined in claim 30, wherein:
(a) said shock absorber means disposed radially outwardly of said lock means.

* * * * *